(12) United States Patent
Wang et al.

(10) Patent No.: US 10,878,049 B2
(45) Date of Patent: Dec. 29, 2020

(54) SEARCH APPARATUS AND SEARCH SYSTEM

(71) Applicant: FUJI XEROX CO., LTD., Tokyo (JP)

(72) Inventors: Chuan Wang, Kanagawa (JP); Takeshi Onishi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 308 days.

(21) Appl. No.: 15/951,733

(22) Filed: Apr. 12, 2018

(65) Prior Publication Data

US 2019/0026373 A1    Jan. 24, 2019

(30) Foreign Application Priority Data

Jul. 21, 2017   (JP) ................. 2017-141481

(51) Int. Cl.
   *G06F 16/9535*   (2019.01)
   *G06F 16/2457*   (2019.01)
(52) U.S. Cl.
   CPC .... *G06F 16/9535* (2019.01); *G06F 16/24575* (2019.01); *G06F 16/24578* (2019.01)
(58) Field of Classification Search
   USPC ........................................ 707/707, 741, 736
   See application file for complete search history.

(56) References Cited

U.S. PATENT DOCUMENTS

| 7,562,068 | B2 | 7/2009 | Naam |
| 8,583,640 | B2 | 11/2013 | Zhang et al. |
| 9,460,158 | B2 | 10/2016 | Zhang et al. |
| 9,870,408 | B2 | 1/2018 | Zhang et al. |
| 2014/0040274 | A1* | 2/2014 | Aravamudan ........ G06F 16/367 707/741 |
| 2016/0255139 | A1* | 9/2016 | Rathod ................... H04L 67/10 709/203 |
| 2018/0285457 | A1* | 10/2018 | Pulbere ................ G06F 16/334 |

FOREIGN PATENT DOCUMENTS

| JP | 4950448 B2 | 6/2012 |
| JP | 5615932 B2 | 10/2014 |

* cited by examiner

*Primary Examiner* — Hung T Vy
(74) *Attorney, Agent, or Firm* — Oliff PLC

(57) ABSTRACT

A search apparatus includes a request acquisition unit that acquires a search request from a user, a search processing unit that executes a search process on a basis of a search target designated in the search request, an information acquisition unit acquires user-related information related to the user, a selection unit, a selection unit, and a providing unit. The selection unit selects, as information expected by the user, a piece of search result information highly relevant to the user-related information if the search processing unit acquires, as search results, multiple pieces of information having mutually different semantic contents and being multiple pieces of search result information from among the multiple pieces of search result information having the different semantic contents. The providing unit provides the user with the information expected by the user selected by the selection unit as a search result responding to the search request.

15 Claims, 4 Drawing Sheets

SEARCH APPARATUS AND SEARCH SYSTEM

CROSS-REFERENCE TO RELATED APPLICATIONS

This application is based on and claims priority under 35 USC 119 from Japanese Patent Application No. 2017-141481 filed Jul. 21, 2017.

BACKGROUND

(i) Technical Field

The present invention relates to a search apparatus and a search system.

(ii) Related Art

In response to a search request made by a user and including a search keyword designated therein, a search apparatus performs searching on the basis of the search keyword and returns at least one search result to the user. If the user intends to obtain, for example, information regarding a term (search keyword) used in a specific field, and if the term is also used in a field different from the specific field and has a different semantic content, the search apparatus returns, as a search result, information in the different field from the specific field, that is, information different from information expected by the user. Further, when being returned as the search result, the information in the different field is displayed in a higher location than the location of the information expected by the user in some cases.

If multiple pieces of information having mutually different semantic contents are obtained as search results, a piece of information having a semantic content different from that of the information expected by the user is displayed as a search result in some cases.

SUMMARY

According to an aspect of the invention, there is provided a search apparatus including a request acquisition unit, a search processing unit, an information acquisition unit, a selection unit, and a providing unit. The request acquisition unit acquires a search request made from a user. The search processing unit executes a search process on a basis of a search target designated in the search request. The information acquisition unit acquires user-related information related to the user. The selection unit selects, as at least one piece of information expected by the user, a piece of search result information highly relevant to the user-related information if the search processing unit acquires, as search results, multiple pieces of information having mutually different semantic contents and being multiple pieces of search result information. The piece of search result information is selected from among the multiple pieces of search result information having the different semantic contents. The providing unit provides the user with the at least one piece of information expected by the user selected by the selection unit as a search result responding to the search request.

BRIEF DESCRIPTION OF THE DRAWINGS

Exemplary embodiments of the present invention will be described in detail based on the following figures, wherein.

DETAILED DESCRIPTION

Hereinafter, exemplary embodiments will be described on the basis of the drawings.

Exemplary Embodiment 1

Figure 1:
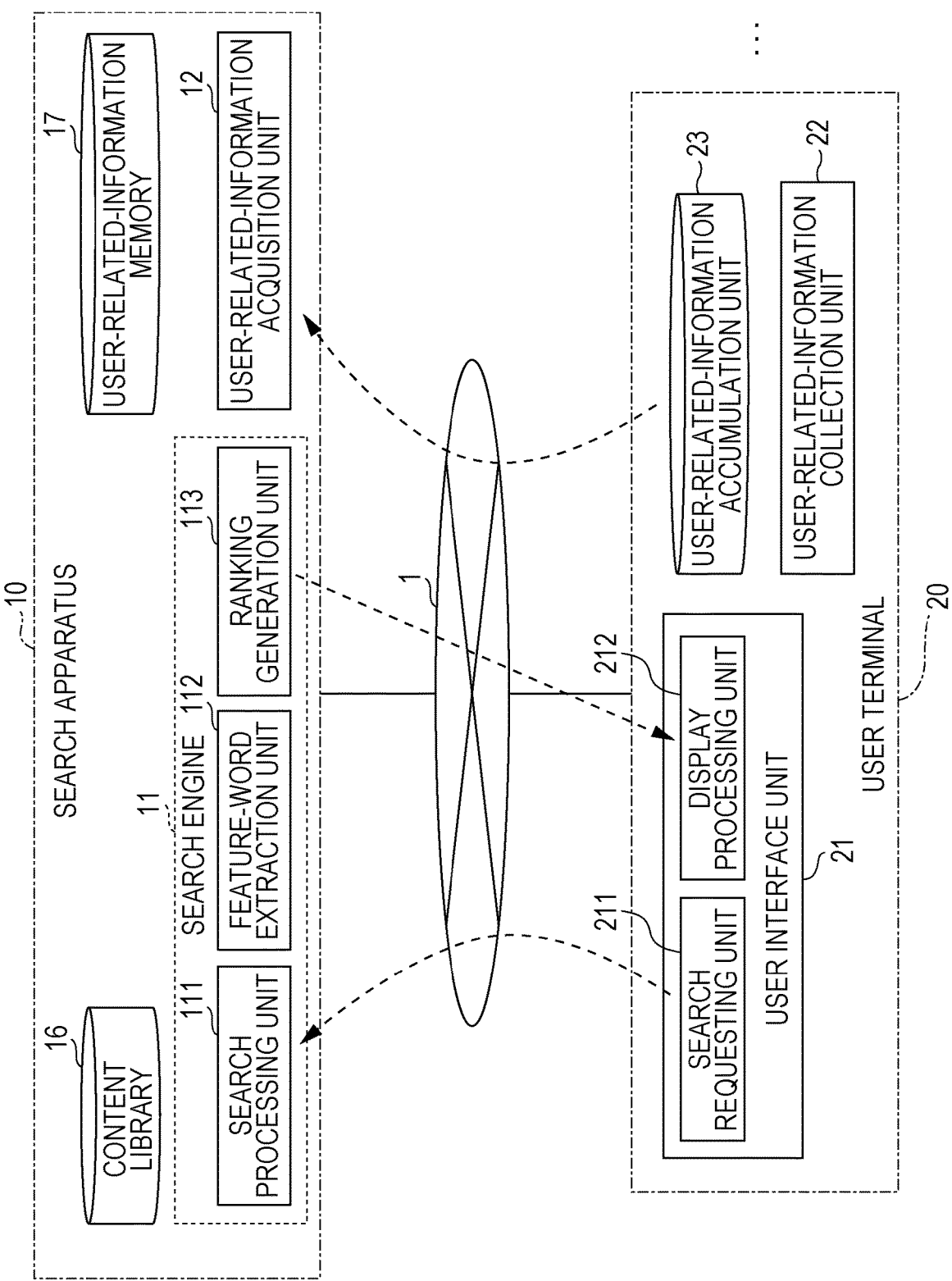
FIG. 1 is a block diagram illustrating a search system according to Exemplary Embodiment 1 of the present invention.

FIG. 1 is a block diagram illustrating a search system according to an exemplary embodiment of the present invention. FIG. 1 illustrates a configuration in which a search apparatus 10 and a user terminal 20 are connected to each other via a network 1 such as the Internet. The search apparatus 10 executes a search process in response to a search request from the user terminal 20 and returns at least one search result. The user terminal 20 is personally used by the user, for example, when the user requests the search apparatus 10 to perform searching. In this exemplary embodiment, the user terminal 20 is assumed to be a general-purpose personal computer (PC) but is not limited to the apparatus. The user terminal 20 may be any terminal apparatus that allows a search application to be run, such as a tablet or a smartphone. Multiple user terminals 20 are connected to the network 1, but FIG. 1 conveniently illustrates only one user terminal 20 because each user terminal 20 has a processing function described later.

Figure 2:
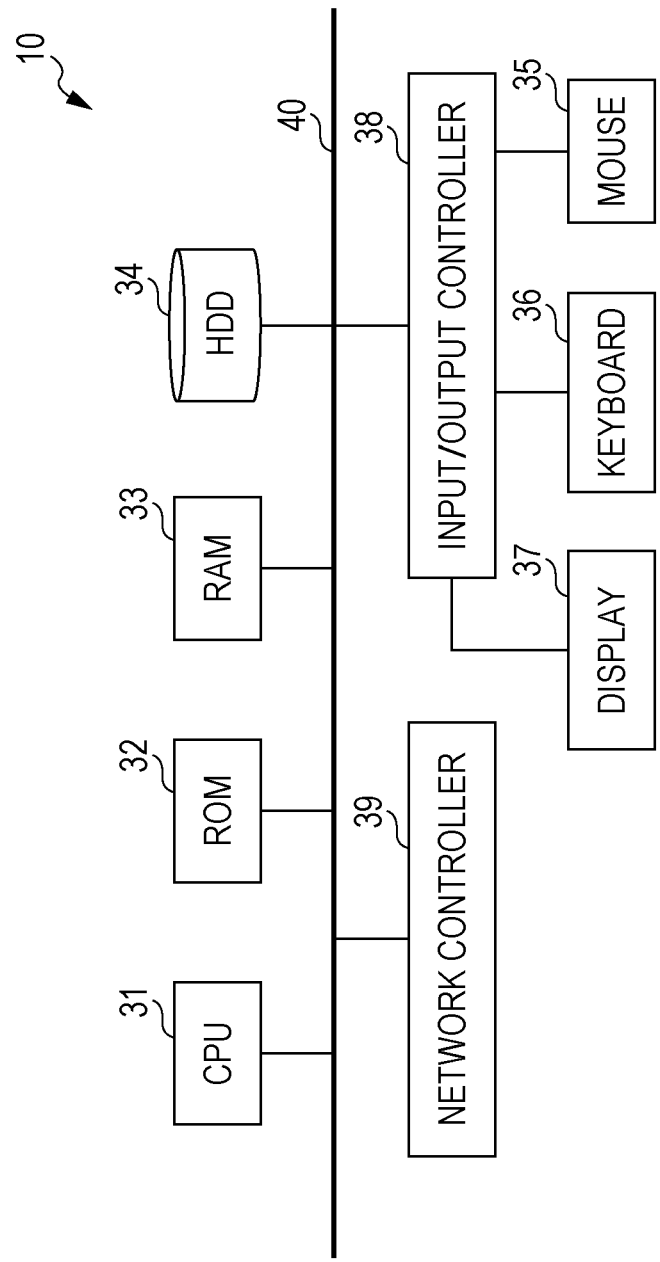
FIG. 2 is a diagram of the hardware configuration of a computer implementing a search apparatus in Exemplary Embodiment 1.

FIG. 2 is a diagram of the hardware configuration of a computer implementing the search apparatus 10 in this exemplary embodiment. In this exemplary embodiment, the computer implementing the search apparatus 10 may be implemented with an existing general-purpose hardware configuration. Specifically, as illustrated in FIG. 2, the search apparatus 10 includes a CPU 31, a ROM 32, a RAM 33, a hard disk drive (HDD) 34, an input/output controller 38 that connects a mouse 35, a keyboard 36, and a display 37, and a network controller 39. The mouse 35 and the keyboard 36 are provided as input units, and the display 37 and the network controller 39 are respectively provided as a display and a communication unit. The components 31 to 39 are connected to an internal bus 40.

Since the user terminal 20 may be implemented by the computer, the same hardware configuration as that of the search apparatus 10 may be illustrated.

Referring back to FIG. 1, the search apparatus 10 includes a search engine 11, a user-related-information acquisition unit 12, a content library 16, and a user-related-information memory 17. Note that components not used for description in this exemplary embodiment are omitted in FIG. 1. The search engine 11 includes a search processing unit 111, a feature-word extraction unit 112, and a ranking generation unit 113 and provides an information searching function. More specifically, the search engine 11 executes the search process in response to a search request from the user terminal 20 and returns at least one search result to the user terminal 20 having transmitted the search request. Note that in this exemplary embodiment, as to be described later, the ranking generation unit 113 selects a piece of information as a piece of information expected by the user from among pieces of information (pieces of search result information) included in the search results acquired by the search processing unit 111, and the search engine 11 provides the user with the piece of information as a search result.

The search processing unit 111 acquires the user's search request transmitted from the user terminal 20 and executes the search process on the basis of a search target designated in the search request. The search target designated in the search request is text (a keyword), a still image, a moving image, sound, or the like. In the description in this exemplary embodiment, a keyword is assumed. In the description in this exemplary embodiment, the search processing unit 111 executes the search process by searching the content library 16 for information, but the information search target does not have to be limited to only the content library 16. For example, the information search target may be an information storage accessible via the network 1, such as a web site or content library of a different search apparatus.

The feature-word extraction unit 112 extracts feature words as pieces of information respectively indicating a feature of the user-related information acquired by the user-related-information acquisition unit 12 and a feature of search result information acquired by the search processing unit 111.

After executing the search process, the search processing unit 111 acquires at least one piece of information as a search result, the piece of information being related to a keyword designated in the search request. The ranking generation unit 113 in this exemplary embodiment functions as a selection unit. If the search processing unit 111 acquires, as search results, pieces of information having mutually different semantic contents and being pieces of search result information, the selection unit selects, as at least one piece of information expected by the user, a piece of search result information highly relevant to the user-related information acquired by the user-related-information acquisition unit 12, the piece of search result information being selected from among the pieces of search result information having the different semantic contents. The ranking generation unit 113 also functions as a ranking unit. If the ranking generation unit 113 provides multiple pieces of information as pieces of information expected by the user, the ranking unit analyzes the user-related information and ranks the multiple provided pieces of information. Specifically, the ranking generation unit 113 ranks the pieces of information and generates rankings. The term "rankings" denotes priorities assigned to the pieces of information included in the search results. Typically, as the priority of a piece of information included in the corresponding search result becomes high, a location where the piece of information is displayed becomes high. It goes without saying that the displaying form does not have to be limited to this, and it is only sufficient that the pieces of information be displayed in such a manner that the priorities are distinguishable. In this exemplary embodiment, the priorities of the pieces of information are determined in accordance with a ranking generation rule that is a descending order of the degree of similarity to the feature word of the user-related information.

The user-related-information acquisition unit 12 acquires the user-related information from the user terminal 20 having transmitted the search request. The user-related information may be acquired from the user terminal 20 as needed or in advance. The term "user-related information" denotes information related to a user who has made a search request and typically denotes information regarding the usage of the user terminal 20 by the user. More detailed description will be provided later.

The content library 16 stores a huge number of pieces of information accumulated therein and is a target of information search to be performed by the search processing unit 111. The content library 16 is updated appropriately.

The user-related-information memory 17 stores therein the user-related information acquired by the user-related-information acquisition unit 12.

The search engine 11 and the user-related-information acquisition unit 12 that are the components of the search apparatus 10 are implemented by cooperative operations between the computer implementing the search apparatus 10 and a program run by the CPU 31 included in the computer. The memory content library 16 and the user-related-information memory 17 that are memories are implemented by the HDD 34 included in the search apparatus 10. Alternatively, the RAM 33 or an external memory may be used via a network.

The user terminal 20 includes a user interface unit 21, a user-related-information collection unit 22, and a user-related-information accumulation unit 23. The user interface unit 21 includes a search requesting unit 211 and a display processing unit 212. The search requesting unit 211 receives a search target designated by the user and transmits the search request including the search target to the search apparatus 10. The display processing unit 212 receives a search result transmitted from the search apparatus 10 and thereafter displays the search result on a display. The user-related-information collection unit 22 collects user-related information related to the user of the user terminal 20. The user-related information collected by the user-related-information collection unit 22 is accumulated in the user-related-information accumulation unit 23.

The user interface unit 21 and the user-related-information collection unit 22 that are the components of the user terminal 20 are implemented by cooperative operations between the computer implementing the user terminal 20 and a program run by a CPU 31 included in the computer. The user-related-information accumulation unit 23 is implemented by a HDD included in the search apparatus 10. Alternatively, a RAM or an external memory may be used via a network.

The programs used in this exemplary embodiment may be provided by using not only the communication unit but also a computer readable recording medium such as a CD-ROM and a USB memory storing the programs. The programs provided from the communication unit or the recording medium are installed on the computer. The CPU of the computer serially runs the programs, and various processes are executed.

The term "pieces of information having mutually different semantic contents" acquired by searching indicates that multiple pieces of information are acquired as search results because the semantic contents of the respective pieces of information acquired by searching are mutually different. For example, pieces of information used in different fields correspond to the pieces of information indicated by this term.

For example, if the search process is executed by using a keyword "PCA", pieces of information in different fields are acquired as search results, such as the terms "principle component analysis" used in the computer science field and "posterior cerebral artery" used in the medical field. As described above, "principle component analysis" and "posterior cerebral artery" are pieces of information having mutually different semantic contents.

In addition, if the search process is executed with the keyword "PCB" in a field, for example, in the computer field, pieces of information related to different terms in the computer terminology such as the phrase "printed circuit board" related to hardware and the phrase "process control block" related to software are acquired as search results. The pieces of information as described above also correspond to "pieces of information having mutually different semantic contents".

Further, if the search process is executed with the keyword "PCA", various pieces of information such as a term description of "PCA", an analysis method, and an essay are acquired as search results even in one field, for example, the computer science field. As described above, pieces of information of different type, content, or technical level of the term description, the analysis method, and the like acquired as the search results for one term also correspond to "pieces of information having mutually different semantic contents".

As described above, in response to a search keyword, the pieces of information having mutually different semantic contents include semantic contents different depending on the field, semantic contents different despite the same field, and further, pieces of information having different content or different levels despite the same term.

Operations of the search system in this exemplary embodiment will be described.

The user terminal 20 transmits a search request to the search apparatus 10 in response to an instruction through a user operation. Regardless of whether an instruction through a user operation as described above is given, the user-related-information collection unit 22 collects user-related information periodically or every event occurrence based on an operation and records the user-related information in the user-related-information accumulation unit 23.

Hereinafter, a ranking providing process in which search results are provided in a ranking form in response to a search request from a user in this exemplary embodiment will be described by using a flowchart illustrated in FIG. 3.

If the user intends to obtain information, the user inputs a keyword in the user terminal 20 and performs searching. Note that the phrase "the user performs searching" is different from the search process executed by the search processing unit 111 to acquire search results and denotes inputting a search keyword in the search window displayed on the display of the user terminal 20 and then pressing a predetermined button for performing searching to request the searching. The phrase as described above is customarily used in this exemplary embodiment.

Upon receiving a search request transmitted from the user terminal 20 (step S111), the search processing unit 111 executes the search process for searching the content library 16 with a keyword designated in the search request and thereby acquires at least one search result (step S112).

The user-related-information acquisition unit 12 acquires user-related information from the user terminal 20 having transmitted the search request and causes the user-related-information memory 17 to temporarily hold the user-related information (step S113).

Note that the phrase "user-related information" denotes information related to a user of the user terminal 20 and information regarding current and past usage of the user terminal 20 by the user. The information regarding the usage of the user terminal 20 includes information indicating the details of settings configured by the user on the user terminal 20 and information regarding a history of user operations of the user terminal 20. The user typically sets a use environment of the user terminal 20 to facilitate the use. For example, the user has installed usually used applications and has created short-cuts to frequently used applications and files on the desktop. In contrast, the user has not installed an application not used by them and does not create a short-cut to the application. As described above, if the details of current settings configured by the user on the user terminal 20, in other words, usages of the user terminal 20 by the user are examined, it is possible to identify a field to which information intended by the user belongs to a certain extent.

The information regarding the history of user operations of the user terminal 20 includes result information indicating the content of user's operation. For example, if the result information is analyzed, the use frequency of each application and searching operations performed in the past are acquired. In the case of the searching operations, it is conceivable that analyzing a designated keyword enables a field of interest to the user to be identified to a certain extent.

In this exemplary embodiment, information regarding usage results including the current usages of the user terminal 20 and past search requests by the user who has made the search request is recorded as the user-related information related to the user.

Note that the user-related information is acquired from the user terminal 20 after the search result acquisition in this exemplary embodiment but does not have to be acquired at this timing. The user-related information may be acquired in advance. For example, only newly accumulated user-related information may be periodically acquired.

Subsequently, the feature-word extraction unit 112 extracts at least one feature word of the user-related information (step S114). In this exemplary embodiment, the feature-word extraction unit 112 extracts the feature word by using term frequency inverse document frequency (TF-IDF). That is, the feature-word extraction unit 112 analyzes the user-related information and thereby obtains frequencies of respective words included in the user-related information. The feature-word extraction unit 112 then extracts at least one word having a frequency greater than or equal to a predetermined threshold as a word representing the feature of the user-related information. The word herein extracted is also called a feature word or an effective word, but the phrase "feature word" is used in this exemplary embodiment.

The feature-word extraction unit 112 likewise processes pieces of information (pieces of search result information) included in the search results acquired by the search processing unit 111 and extracts at least one feature word of each piece of search result information (step S115). Each feature word of the corresponding piece of search result information may be processed earlier than the feature word of the user-related information. In this exemplary embodiment, the feature word is extracted as an index for the feature of a corresponding one of the user-related information and the search result information. It goes without saying that a feature word does not have to be limited to the feature word acquired by using TF-IDF, and the feature may be extracted by using a different method.

The type and the range of the user-related information referred to by the feature-word extraction unit 112 does not have to be particularly limited. However, information collected within such a predetermined period that is not excessively backdated, for example information collected within one month is referred to. Alternatively, a predetermined amount of information is referred to. This is because there is a possibility that referring to excessively backdated information to identify the field of information currently intended to be found by the user leads to deterioration of accuracy of selecting information expected by the user. For example, searching performed on excessively backdated information on the basis of a supposed degree of mastery of the user leads to referring to even information before the current degree of mastery of the user.

The case of limiting the period for referring to the user-related information is herein exemplified, but instead of setting a long period, heavier weighting may be assigned to more recent information. Alternatively, in extracting a feature word, all of the pieces of user-related information do not have to be referred to. Instead, at least one of types of user operation result, environment setting, search result, and the like of the information may be selected in accordance with the characteristics of the user, the state at the time of searching, or the like, and then the user-related information may be referred to.

Here, the phrase "information expected by the user" is described. For example, if the user performs searching with the keyword "PCA" and expects to obtain a description of a term in the computer science field, the phrase "principle component analysis" acquired as a search result corresponds to the information expected by the user. In contrast, the phrase "posterior cerebral artery" in the medical field is used in a different field and thus does not correspond to the information expected by the user.

In addition, if the user intends to set an IP address and performs searching with the keyword "address", the intended information is information related to an IP address. Accordingly, the information related to an IP address that is acquired as a search result corresponds to the information expected by the user. In contrast, information related to a MAC address does not correspond to the information expected by the user.

Suppose a case where the user is a well-skilled user who is acquainted with IP addresses and performs searching with the keyword "IP address". Among pieces of information related to "IP address", the intended information is not information for a user with a beginner level such as a term description but information for a user with an intermediate level or higher, such as a method for setting an IP address. Accordingly, information regarding a method for changing an "IP address" that is acquired as a search result corresponds to the information expected by the user. In contrast, a term description of "IP address" does not correspond to the information expected by the user.

As described above, the phrase "information expected by the user" denotes, among pieces of information (pieces of search result information) acquired by the search processing unit 111 as search results, a piece of information having a semantic content that is supposed to be the semantic content of a piece of information intended to be obtained by the user on the basis of the user-related information of the user. To identify and select information expected by the user, TF-IDF is used in this exemplary embodiment.

After the feature-word extraction unit 112 extracts the feature words of the user-related information and search result information, the ranking generation unit 113 compares the feature word of the user-related information with each feature word of the corresponding piece of search result information and calculates, for each piece of search result information, a degree of similarity to the feature word of the user-related information (step S116). As a method for calculating the degree of similarity, an existing technique such as a vector space method may be used.

In this exemplary embodiment, a search result that has a feature word having a higher degree of similarity to the feature word of the user-related information is judged to be more highly relevant to the user-related information, and information highly relevant to the user-related information is supposed to be information expected by the user as a search result.

For example, if the user is engaged in work related to computer science, the user searches for a term related to the computer science and creates a short-cut of an application on the desktop. Accordingly, the user-related information including the environment settings, use results, and the like of the user terminal 20 of the user includes more pieces of information related to the computer science than pieces of information related to the other fields, and thus more words related to the computer science than words related to the other fields are considered to be extracted as the feature words of the user-related information related to the user. Accordingly, a feature word of "principle component analysis" in the computer science field has a relatively high degree of similarity to the feature words of the user-related information related to the user, while a feature word of "posterior cerebral artery" in the medical field has a relatively low degree of similarity.

If the user is engaged in software development, the user searches for a term related to an operating system (OS) and examines the internal structure of the OS. Accordingly, the feature words of the user-related information related to the user are considered to include more words related to the software development than words related to the other matters. Accordingly, a feature word of "process control block" related to software has a relatively high degree of similarity to the feature words of the user-related information related to the user, while a feature word of "printed circuit board" related to hardware has a relatively low degree of similarity.

If the user is engaged in the software development and has a high degree of mastery in the field, the user is considered to use the user terminal 20 for installing an OS analysis tool, opening a setting screen, searching for an essay, and the like by looking up how to perform an operation of an application in the help file of the application. Accordingly, the feature words of the user-related information related to the user include more words used by a user with a high technical level than the other words. Accordingly, a feature word of information with a high technical level has a relatively high degree of similarity to the feature words of the user-related information related to the user, while a feature word of information with a low technical level has a relatively low degree of similarity.

Note that the degree of matching may be obtained instead of the degree of similarity because it is normally appropriate to obtain the degree of matching with the feature words of the user-related information. However, a term having the same semantic content is spelled out differently between the user-related information and the search result information in some cases, such as "yuu-za-in-ta-fei-su", "yuu-zaa-in-ta-fei-su", and "yuu-za-in-taa-fei-su". In this exemplary embodiment, the degree of similarity is calculated with such cases, that is, expression variations taken into consideration.

After calculating the degree of similarity, the ranking generation unit 113 selects, as information expected by the user, at least one of the pieces of search result information for which the degrees of similarity are calculated. The selected search result information has a degree of similarity greater than or equal to a threshold set in advance (step S117). If the degree of similarity of search result information is greater than or equal to the threshold, the search result information is judged to be highly relevant to the user-related information. If the degree of similarity of search result information is lower than the threshold, the search result information is judged to be slightly relevant to the user-related information. According to the example above, "principle component analysis" in the computer science field is judged to be highly relevant, and "posterior cerebral artery" in the medical field is judged to be slightly relevant.

If multiple pieces of search result information have a degree of similarity greater than or equal to the threshold, the ranking generation unit 113 generates rankings by assigning priorities to the multiple pieces of search result information in descending order of the degree of similarity (step S118). As described above, the ranking generation unit 113 generates the rankings of the pieces of search result information on the basis of the degrees of similarity calculated by analyzing the user-related information.

The search engine 11 transmits the rankings generated in the above-described manner in response to the search request from the user (step S119).

The display processing unit 212 in the user terminal 20 presents, to the user, the search results in the ranking form transmitted from the search apparatus 10, such as by displaying the search results on the display. Note that the pieces of information included in the search results are arranged in descending order of the degrees of similarity corresponding to the priorities assigned to the pieces of information. Typically, as the priority of a piece of information becomes high, the location where the piece of information is displayed becomes high. This helps the user to easily find expected information, that is, intended information from a list of search results (rankings). Note that the display form of the rankings is not the spirit of this exemplary embodiment, and thus description thereof is omitted.

If information in a field different from a field expected by the user has a relatively low degree of similarity to the feature words of the user-related information, the information is considered not to be selected because the threshold comparison is used. However, judging whether the field is the same or different on the basis of the threshold comparison leads to a theoretical possibility that information in a different field is selected as information expected by the user, depending on the usage of the user terminal 20 by the user. However, in this exemplary embodiment, the priorities are assigned to pieces of information in accordance with the degree of similarity to the feature words of the user-related information, and thus the information in the different field is displayed in a low location.

In addition, there is a possibility that pieces of information such as term descriptions or essays that have different technical levels but belong to the same field are extracted as pieces of information expected by the user. Specifically, if users who are engaged in computers but have different degrees of mastery perform searching with the same keyword being designated, each user obtains, as the search results, the same pieces of information. However, in this exemplary embodiment as described above, the priorities are assigned to the pieces of information in accordance with the degree of similarity to the feature words of the user-related information, and thus the content of the rankings is different. For example, the user with a high degree of mastery is provided with information with a low technical level in some cases, but information with a low technical level is displayed in a low location.

In this exemplary embodiment as described above, even if different users designate the same keyword and requests searching, different rankings are provided on the basis of each user's special field or the degree of mastery supposed from the user-related information related to the user having requested the searching.

In this exemplary embodiment as described above, instead of returning the search results acquired by the search processing unit 111 in such a manner that the search results are left untouched, information highly relevant to the user-related information related to the user having made the search request is selected as information expected by the user from among pieces of information acquired as the search results. The selected information is presented to the user as a search result responding to the search request.

Note that after the search processing unit 111 executes the search process on the basis of a keyword designated by the user, the ranking generation unit 113 selects a piece of information expected by the user from among the acquired pieces of search result information on the basis of the feature words of the user-related information and search result information that are extracted by the feature-word extraction unit 112. However, the feature word of the user-related information may be processed for the use for the search process.

Figure 3:
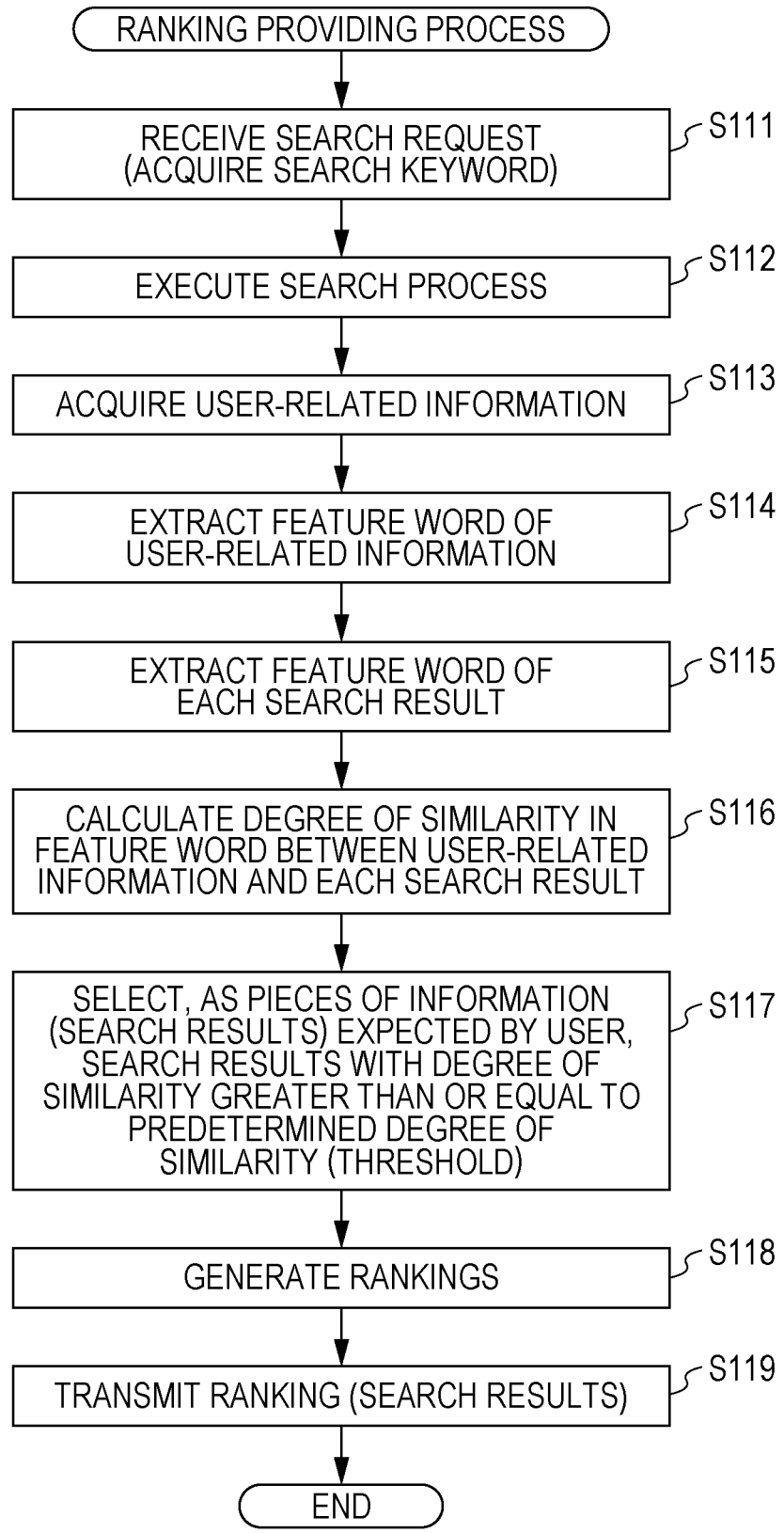
FIG. 3 is a flowchart illustrating a ranking providing process in Exemplary Embodiment 1.

Specifically, acquiring the user-related information (step S113) and extracting the feature word of the user-related information (step S114) in FIG. 3 are performed before the search process. The search processing unit 111 adds the feature word of the user-related information extracted by the feature-word extraction unit 112 to the keyword designated in the search request and thereafter executes the search process (step S112).

As described above, the search process is executed on the basis of the keyword designated in the search request and the feature word of the user-related information acquired by the search processing unit 111, and thereby search results narrowed down by using the feature word of the user-related information are acquired. As described above, the pieces of search result information from which the degree of similarity is to be calculated are narrowed down, and thus the processing load on the ranking generation unit 113 in selecting the information expected by the user is reduced. Alternatively, each piece of search result information acquired by the search processing unit 111 may be regarded as the information expected by the user, and the process for comparing the degree of similarity of the piece of search result information with the threshold may be omitted.

Exemplary Embodiment 2

As described in the aforementioned Exemplary Embodiment 1, the feature word of user-related information related to the user having made a search request is compared with the feature words of pieces of search result information, and at least one piece of information expected by the user is selected as a search result. However, for example, if the user terminal 20 is not well utilized because the user terminal 20 has just been purchased or the user has been transferred to a new department, or for other reasons, useful user-related information has not been collected. It is thus assumable that an effective feature word to select the piece of information expected by the user is not acquired.

In an exemplary embodiment, even in the situation described above, at least one piece of information expected by the user is provided as a search result.

Figure 4:
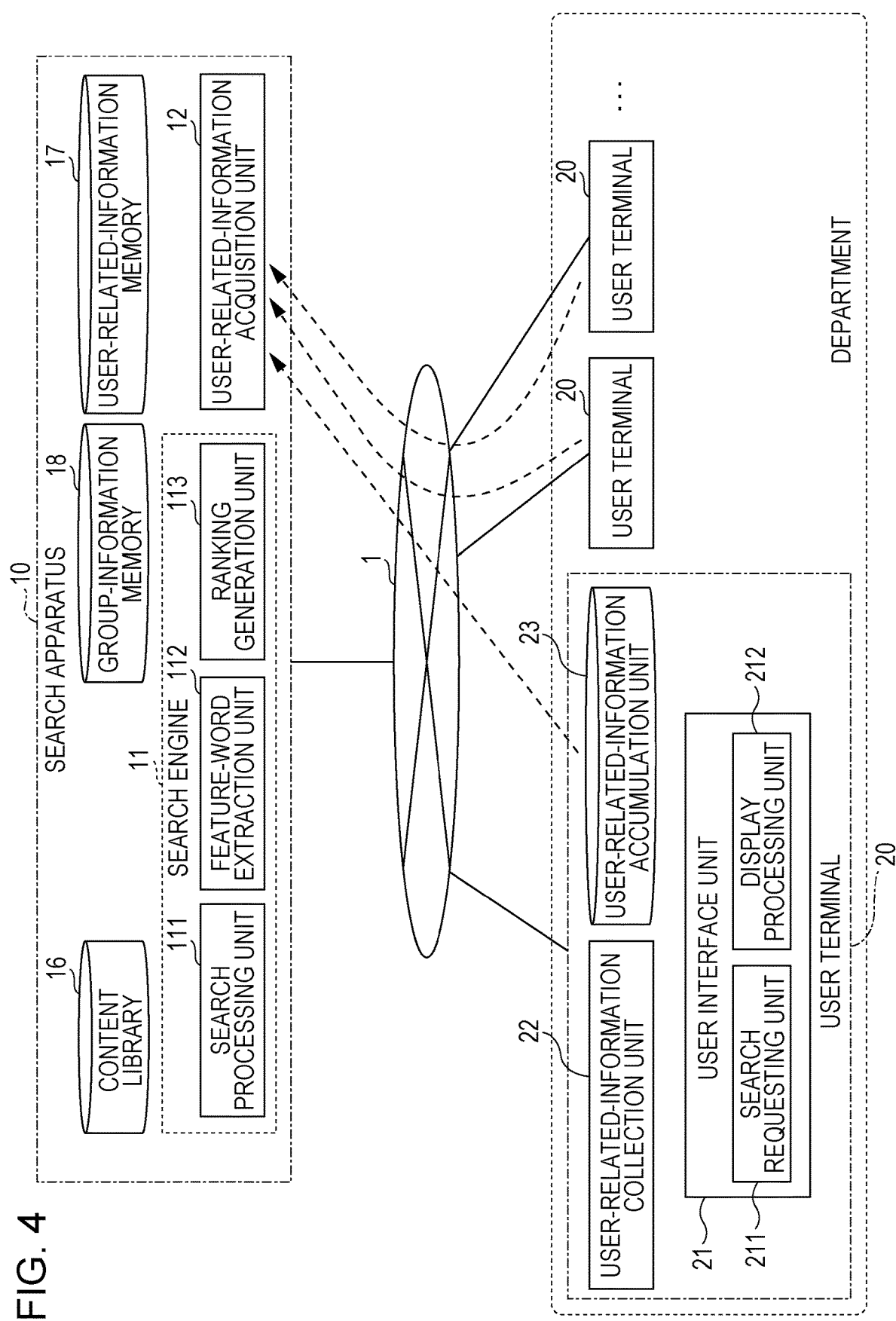
FIG. 4 is a block diagram of a search system in Exemplary Embodiment 2.

FIG. 4 is a block diagram of a search system in this exemplary embodiment. In FIG. 4, the same components of those of the search system in Exemplary Embodiment 1 are denoted by the same reference numerals, and description thereof is omitted. A search apparatus 10 in this exemplary embodiment has a configuration in which a group-information memory 18 is added to the configuration of the search apparatus 10 in Exemplary Embodiment 1. In the group-information memory 18, pieces of identification information (user IDs) of users who belong to one of groups and pieces of information (such as IP addresses) respectively identifying the user terminals 20 used by the respective users are set and registered in association with each other on a per-group basis. For example, departments of a company are assumed as the groups.

Each user terminal 20 may have the same configuration as that in Exemplary Embodiment 1. FIG. 4 illustrates the multiple user terminals 20 connected to the network 1 to clearly indicate that different users belonging to the same group also use the respective user terminals 20 in this exemplary embodiment.

Note that the hardware configuration in the search system may be the same as that in Exemplary Embodiment 1.

Operations in this exemplary embodiment will be described. The operations may be basically the same as those in Exemplary Embodiment 1 illustrated by using the flowchart in FIG. 3. However, a slight difference lies in the acquisition of user-related information in step S113 and the extraction of the at least one feature word.

Specifically, in step S113, the user-related-information acquisition unit 12 acquires the user-related information from the user terminal 20 having transmitted the search request in the same manner as in Exemplary Embodiment 1. However, if the data amount of the acquired user-related information is smaller than a threshold representing an amount supposed to be sufficient to extract useful feature words, the user-related-information acquisition unit 12 refers to the group-information memory 18, identifies users belonging to the same group of the user having made the search request, acquires user-related information related to the identified users from the user terminals 20 respectively used by the identified users, and writes and stores the user-related information in the user-related-information memory 17. Note that it is only sufficient that the total amount of the acquired user-related information be greater than or equal to the threshold, and thus user-related information related to all of the users belonging to the same group does not have to be acquired.

Examples of the case where the data amount is smaller than the threshold include a case where the user does not use the user terminal 20 frequently and a case where the user-related information is collectable only in a short period. In this exemplary embodiment, the users belonging to the same group as the group of the user having made the search request are considered to have acquired information related to a field similar to the field for the user having made the search request and have made similar search requests.

In this exemplary embodiment, groups are formed on a per-department basis on the assumption that the users belonging to the same department use the respective user terminals 20 in the same manner. However, it is only sufficient that a group be formed by users who use the user terminals 20 in the same manner and that group information be generated. The group does not have to be generated on a per-department basis.

Steps other than the acquisition of the user-related information described above may be the same as those in Exemplary Embodiment 1, and description thereof is omitted.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiment were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A search apparatus comprising:
a processor configured to:
acquire a search request made from a user;
execute a search process on a basis of a search target designated in the search request;
acquire user-related information related to the user;
select, as at least one piece of information expected by the user, a piece of search result information highly relevant to the user-related information if the processor acquires, as search results, a plurality of pieces of information having mutually different semantic contents and being a plurality of pieces of search result information, the piece of search result information being selected from among the plurality of pieces of search result information having the different semantic contents;
acquire a feature of the user-related information and features of the pieces of search result information;
refer to a degree of similarity between the feature of the user-related information and each feature of a corresponding one of the pieces of search result information and that selects the at least one piece of information expected by the user from among the plurality of pieces of search result information, wherein if the feature of the user-related information is not acquirable, the processor acquires user-related information related to a different user who belongs to a group to which the user having made the search request belongs, and the processor refers to the acquired user-related information related to the different user and supposes a feature of the user-related information related to the user having made the search request; and
provide the user with the at least one piece of information expected by the user selected by the processor as a search result responding to the search request.

2. The search apparatus according to claim 1,
wherein the processor is configured to select a piece of search result information with a high degree of similarity to the feature of the user-related information as the at least one piece of information expected by the user from among the plurality of pieces of search result information.

3. The search apparatus according to claim 1,
wherein the processor is configured to execute the search process on a basis of the search target and the feature of the user-related information, the search target being designated in the search request, the feature of the user-related information being acquired by the processor, and
wherein the processor is configured to provide the user with one of the search results of the search process performed by the search processing unit as the search result responding to the search request.

4. The search apparatus according to claim 1,
wherein if the search target is used in a plurality of fields, and if the processor thus acquires a plurality of pieces of information having mutually different semantic contents that are a plurality of pieces of search result information, the processor is configured to select, as at least one piece of information expected by the user, a piece of search result information belonging to a field highly relevant to the user-related information from among the plurality of pieces of search result information having the different semantic contents.

5. The search apparatus according to claim 1, wherein the processor is configured to
analyze the user-related information if a plurality of pieces of information are provided as a plurality of the pieces of information expected by the user and rank the plurality of provided pieces of information,
wherein the processor is configured to provide the user with the pieces of information with rankings of the provided pieces of information being indicated.

6. The search apparatus according to claim 5,
wherein the user-related information is a piece of information regarding usage of a terminal apparatus used by the user for the search request.

7. The search apparatus according to claim 5,
wherein the processor is configured to rank the pieces of information provided to the user on a basis of a degree of mastery of the user, the degree of mastery being supposed from the user-related information.

8. The search apparatus according to claim 6,
wherein the piece of information regarding the usage of the terminal apparatus is a piece of information indicating details of a setting configured by the user on the terminal apparatus.

9. The search apparatus according to claim 6,
wherein the piece of information regarding the usage of the terminal apparatus is a piece of information regarding a history of an operation performed by the user on the terminal apparatus.

10. The search apparatus according to claim 9,
wherein the piece of information regarding the history of the operation is a piece of information indicating a history of a search request by the user.

11. The search apparatus according to claim 1,
wherein the user-related information is a piece of information regarding usage of a terminal apparatus used by the user for the search request.

12. The search apparatus according to claim 11,
wherein the piece of information regarding the usage of the terminal apparatus is a piece of information indicating details of a setting configured by the user on the terminal apparatus.

13. The search apparatus according to claim 11,
wherein the piece of information regarding the usage of the terminal apparatus is a piece of information regarding a history of an operation performed by the user on the terminal apparatus.

14. The search apparatus according to claim 13,
wherein the piece of information regarding the history of the operation is a piece of information indicating a history of a search request by the user.

15. A search system comprising:
a search apparatus; and
a terminal apparatus used by a user for a search request,
the terminal apparatus including a first processor configured to collect user-related information related to the user of the terminal apparatus,
the search apparatus including a second processor configured to
acquire the search request transmitted from the terminal apparatus,
execute a search process on a basis of a search target designated in the search request,
acquire the user-related information from the terminal apparatus,
select, as information expected by the user, a piece of search result information highly relevant to the user-related information if the processor acquires, as search results, a plurality of pieces of information having mutually different semantic contents and being a plurality of pieces of search result information, the piece of search result information being selected from among the plurality of pieces of search result information having the different semantic contents,
acquire a feature of the user-related information and features of the pieces of search result information,
refer to a degree of similarity between the feature of the user-related information and each feature of a corresponding one of the pieces of search result information and that selects the at least one piece of information expected by the user from among the plurality of pieces of search result information, wherein if the feature of the user-related information is not acquirable, the second processor acquires user-related information related to a different user who belongs to a group to which the user having made the search request belongs, and the second processor refers to the acquired user-related information related to the different user and supposes a feature of the user-related information related to the user having made the search request, and
provide the user with the information expected by the user selected by the second processor as a search result responding to the search request.

* * * * *